UNITED STATES PATENT OFFICE.

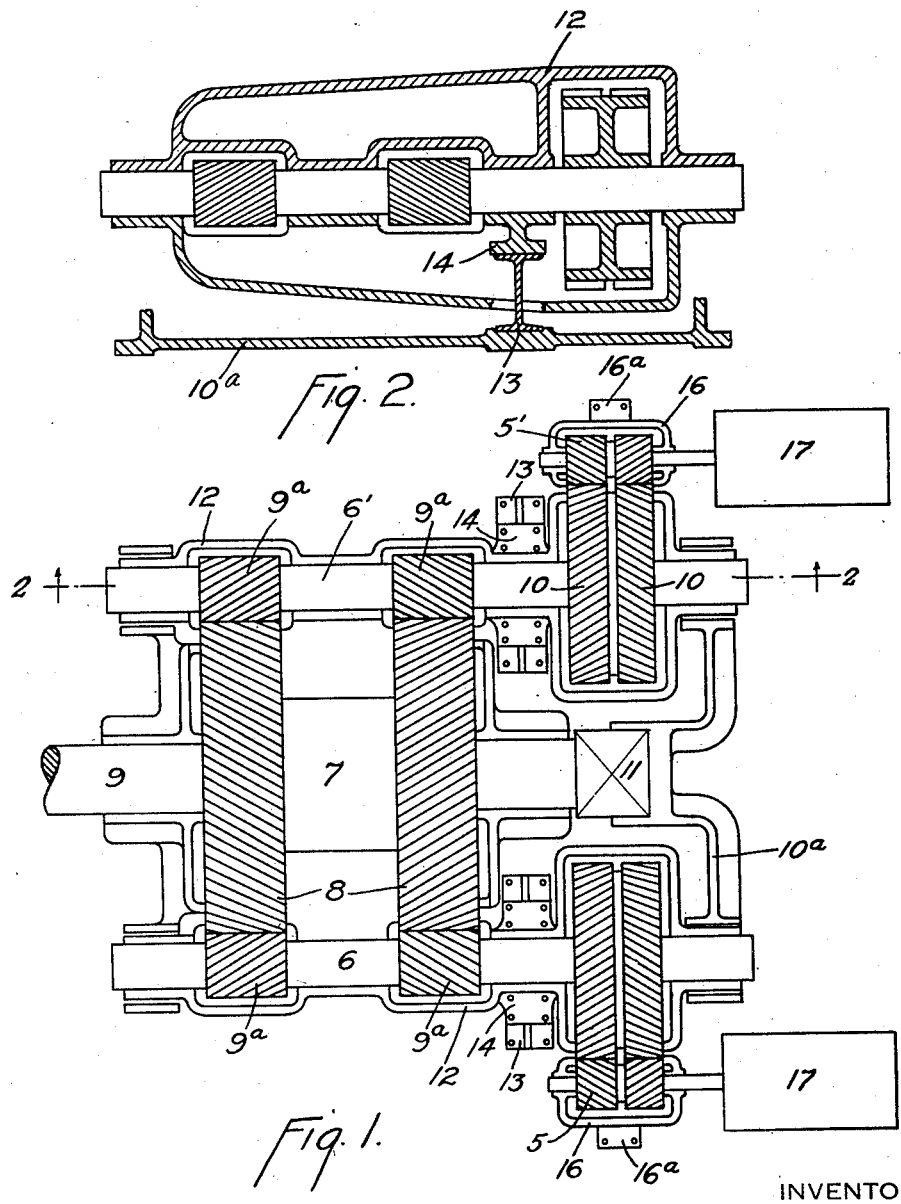

FRANCIS HODGKINSON, OF EDGEWOOD, PENNSYLVANIA, ASSIGNOR TO THE WESTINGHOUSE GEAR & DYNAMOMETER COMPANY, A CORPORATION OF PENNSYLVANIA.

REDUCTION-GEARING.

1,357,931.	Specification of Letters Patent.	Patented Nov. 2, 1920.

Application filed June 16, 1916. Serial No. 103,993.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful Invention in Reduction-Gearing, of which the following is a specification.

This invention relates to power transmission gearing and has for an object to produce a double reduction gear or gearing which is shorter, axially of the gears, than other reduction gearing adapted to transmit substantially the same power and accomplish substantially the same speed reduction.

A further object is to produce a power transmission or speed change gearing for accomplishing the speed change in two steps instead of one, which is of simpler construction and shorter axially of the gears than gearing capable of transmitting substantially the same power and of accomplishing the same speed transformation, and in which new and improved means are employed for compensating for deflection or distortion of the gears or gear carrying members and also for slight inaccuracies in the gear teeth.

The gears of power transmission gearing are liable to and do distort under load. The distortion may be either a torsional or a transverse deflection and is more marked in long gears or in relatively long gear carrying members. A torsional deflection is ordinarily encountered and would result in an unequal distribution of pressure along the intermeshing teeth if means were not employed to compensate for it. In U. S. Patent No. 946,455 issued to G. W. Melville and J. H. Macalpine, a reduction gearing is shown, in which the speed transformation is accomplished in one step and in which one gear, of an intermeshing pair, is so mounted that it is capable of occupying different angular positions, with relation to the axis of the other gear, and of thereby compensating for deflection or distortion of the gear or gear teeth.

A specific object of my invention is to produce a double reduction gearing in which the speed transformation is accomplished in two steps and in which the large gear of one pair is formed integrally with or is rigidly connected to the small gear of the other pair and is capable of occupying different angular positions, with relation to the other gears for the purpose of compensating for distortion of the gears or for slight inaccuracies of the gear teeth.

This, together with the previously enumerated objects, and other objects, which will be made apparent throughout the further description of the invention, are accomplished by means of apparatus embodying the features herein described and illustrated.

In the drawings: Figure 1 is a more or less diagrammatic plan view of a double reduction gearing embodying my invention and shown in connection with two driving agents.

Fig. 2 is a vertical longitudinal sectional view taken along the line 2—2 of Fig. 1.

In the illustrated embodiment of my invention I have disclosed a main gear, which is adapted to be operatively connected to a driven agent; meshing with this gear is a pinion which may be termed the intermediate pinion and is shown integrally formed with a larger gear forming a part of the first pair of reduction gears. The larger gear may be termed the intermediate gear wheel and meshes with the main driving gear or pinion, which is operatively connected to the driving agent. The intermediate pinion and the intermediate gear wheel, above mentioned, form an intermediate gear member which is so mounted that it is capable of occupying different angular positions, with relation to the axes of the main gear and the main pinion, for the purpose of compensating for distortion of the gears or gear members and for slight inaccuracies in the gear teeth. The driving pinion is also mounted so that it is capable of angular motion, with relation to the normal position of its axis, for the purpose of following the angular movements of the intermediate gear member and also for compensating for distortion of either the intermediate gear member or the driving pinion.

For convenience of description I have described my invention as a double reduction gearing, but I desire it to be understood that I do not wish to limit it in this respect, since those skilled in the art will readily appreciate that the invention is equally applicable to transmission gearing, in which the driven agent rotates at a speed higher than that of the driving agent. It will be equally apparent to those skilled in the art that the illustrated embodiments of my invention may be employed in accomplishing such a speed transformation.

Referring now to the apparatus illustrated in the drawings:

Fig. 1 is a plan view of an embodiment of the invention, which is capable of transmitting power from two driving agents to a single driven agent. The gearing therefore includes two gears or pinions 5 and 5', each of which may be designated as a driving gear. The apparatus also includes two gear members 6 and 6', each of which may be designated as an intermediate gear member, since each consists of a large or intermediate gear wheel meshing with one of the driving gears, and a small gear member or intermediate pinion which meshes with the main driven gear 7. The gear 7 is mounted on a shaft 9, which is journaled in bearings mounted on the frame 10$^a$ of the gearing. The bearings of the shaft 9 are stationary, relatively to the frame 10$^a$, and I have diagrammatically illustrated a thrust bearing 11 for taking up any longitudinal or axial thrust which may be imparted to the shaft 9.

The gear 7 is preferably provided with two sets of oppositely inclined helical teeth 8 and, as illustrated, these sets of teeth are spaced apart. Each intermediate gear member 6 and 6' is therefore provided with correspondingly spaced sets of teeth 9$^a$, which mesh with the set 8 and constitute the intermediate pinion. I have also shown each intermediate gear carrying member provided with two sets of oppositely inclined teeth 10, which constitute the intermediate large gear and mesh with correspondingly spaced sets of teeth formed on the coöperating pinion or driving gear.

In order to compensate for distortion of the gears or gear members or for slight inaccuracy in the cutting of the gear teeth, I have shown each intermediate gear member journaled in a floating frame 12, and each driving gear or pinion journaled in a separate floating frame 16. These frames are similar in some respects to the floating frame illustrated and described in the patent to which I have referred.

Each floating frame 12 is mounted on the frame 10$^a$, of the gearing, in such a way that it may move to different angular positions and thereby cause the gear member, journaled in it, to assume different angular positions, with relation to the axis of the gear 7. As illustrated, each frame 12 is mounted on a flexible I-beam 13 (clearly shown in section in Fig. 2), one flange of which is rigidly secured to the stationary frame 10$^a$, whereas the other flange is rigidly secured to a pedestal or mounting flange 14, of the floating frame. As shown, the mounting flange 14 is located between the gear teeth 9$^a$ and 10 of the intermediate gear carrying member, but it will be understood that this is merely a question of design, since the flexible I-beam should be so located that the center of forces, acting on the gear member, falls within the plane of the normal position of the web of the I-beam, so that the I-beam will not flex under normal operating conditions.

With this arrangement of apparatus, the floating frame may assume different positions, with relation to the axis of the gear 7. For example, the frame may move so that the axis of the gear carrying member, journaled in it, assumes angular positions in a plane perpendicular to the plane defined by the normal positions of the axes of the gear 7 and the intermediate gear carrying member. This movement of the frame occasions a flexure of the web of the I-beam. The frame may also move so that the intermediate gear carrying member moves to angular positions in the horizontal plane of the axes of that member, or in the plane defined by the normal positions of the axes of the two intermeshing gears. This movement of the frame occasions a compound distortion of the web of the I-beam.

Where it is desired to limit the angular motion of the intermediate gear carrying members, to motion in a plane perpendicular to the plane defined by the normal positions of the axes of the intermeshing gears, struts, such as described by the Melville et al. patent, may be employed. With the arrangement of apparatus described the position of each intermediate gear carrying member will be automatically adjusted with relation to the gear 7, so as to automatically distribute tooth pressures uniformly along the intermeshing teeth.

The floating frame 16, in which each driving gear is mounted, permits each driving gear to move and to compensate for distortion, of either the driving gear or of the intermediate gear carrying member coöperating with it, and also to permit each driving gear to automatically adjust itself to the varying positions of the coöperating intermediate gear carrying member. Each floating frame 16 may be mounted on an I-beam 16$^a$, similar to the beams 13, and which, like the beams 13, is mounted on the frame 10$^a$. As shown the supporting I-beams 16$^a$ are located midway between the ends of the gear supported by it. The angular motion of each floating frame 16 may be limited, as described in the patent to which I have referred, and a flexible connection similar to, or the equivalent of the flexible connection therein described, may be employed between each driving gear and its coöperating driving agent 17.

While I have illustrated and described but one embodiment of my invention, it will be apparent to those skilled in the art that various changes, modifications, additions and omissions may be made in the apparatus illustrated without departing from the spirit and scope of the invention as set forth by the appended claims.

What I claim is:

1. A transmission gearing, comprising a driving gear, a driven gear, an intermediate gear member for transmitting power from the driving to the driven gear and including a gear for meshing with the driving gear and a pinion for meshing with the driven gear, and means for supporting the gear member so as to allow relative angular motion between the axis of the gear member and the axis of one of the coöperating gears.

2. A transmission gearing, comprising a driving gear, a driven gear, a gear member meshing with both said gears, and means for supporting the gear member so as to compensate for inaccuracies or deflection of the gear member and the gears.

3. A transmission gearing comprising a driving gear, a driven gear, an intermediate gear member for transmitting power from the driving to the driven gear and for accomplishing a speed change with the driving gear and a second speed change with the driven gear, and resilient supporting means for the gear member and one of the gears.

4. A transmission gearing, comprising a driving gear, a driven gear, an intermediate gear member for transmitting power from the driving to the driven gear and for effecting a speed transformation with each of said gears, and means for supporting the gears and intermediate member so as to compensate for distortion of the gears or said intermediate member.

5. A transmission gearing, comprising a driving gear, a driven gear, an intermediate gear member for transmitting power from the driving to the driven gear and for effecting two speed transformations and a floating frame in which said gear member is mounted.

6. A transmission gearing, comprising a driving gear, a driven gear, an intermediate gear member including a pinion meshing with the driven gear and a gear meshing with the driving gear for transmitting power from the driving to the driven gear and for effecting a double transformation, a floating frame in which said gear member is mounted, and means for mounting one of said gears so that its axis is capable of occupying different angular positions.

7. A transmission gearing comprising a driving gear, a driven gear, an intermediate gear member between said gears, and meshing with both so as to accomplish a double speed change, a floating frame in which said gear member is journaled, and a floating frame in which one of said gears is journaled.

8. A double reduction gearing comprising a driving pinion, a floating frame in which said pinion is journaled, a driving gear, an intermediate gear member meshing with said pinion and with said gear, and a floating frame in which said member is mounted.

9. A double reduction gearing comprising a driven gear, two speed reducing gear members meshing with said gear, a separate driven gear meshing with each gear member and means for compensating for distortion of said gears or said members by shifting the angular positions of the members with relation to the gears.

10. In a double reduction gearing, a driving gear, a driven gear, an intermediate speed reducing gear member meshing with both said gears, a floating frame on which said member is journaled and a flexible I-beam on which said frame is mounted.

11. A power transmission gearing, comprising a driving gear, a driven gear and an intermediate gear member meshing with both said gears for transmitting power from the driving to the driven gear mounted so as to occupy different angular positions in a plane perpendicular to the plane defined by the normal position of its axis and the axis of one of the intermeshing gears.

12. In a double reduction gearing, a double driven gear, a driving gear, an intermediate gear member including a gear meshing with the driving gear and a double pinion meshing with the driven gear, and a resiliently supported frame in which the gear member is mounted and having a supporting bearing for the gear member between the two parts of the double pinion.

13. In a double reduction gearing, a driven gear, a driving gear, an intermediate integral gear member including a gear for meshing with the driving gear and a gear for meshing with the driven gear, and a resiliently supported unit frame member in which the integral gear member is mounted.

14. In a double reduction gearing, a driving pinion, an intermediate gear wheel meshing therewith, an intermediate pinion operatively secured thereto, a driven gear meshing with said intermediate pinion and a movable frame in which said intermediate gear wheel and intermediate pinion are mounted.

15. In a double reduction gearing, a driving pinion, an intermediate gear wheel meshing therewith, an intermediate pinion operatively secured to said gear wheel, a driven gear meshing with said intermediate pinion, a floating frame in which said gear wheel and intermediate pinion are journaled, and means for compensating for distortion of the driving pinion.

16. In combination in a double reduction gearing, a driven gear, two intermediate pinions meshing therewith, a separate intermediate gear wheel operatively connected to each intermediate pinion, a separate floating frame in which each intermediate pinion and its coöperating gear wheel are journaled, and a separate driving pinion meshing with each intermediate gear wheel.

17. In a power transmission gearing, a driven gear, two driving gears, and a separate intermediate gear member for transmitting power from each driving gear to said driven gear and for accomplishing two speed transformations, in combination with a separate floating frame in which each intermediate gear member is journaled and a separate floating frame in which each driving gear is journaled.

18. In a power transmission toothed gearing where power from two power units is employed, a driven gear, two driving gears, a separate intermediate gear member for transmitting power from each driving gear to the driven gear, and means for supporting the driving gears and the intermediate gear members so as to compensate for distortion of the driving gears and the intermediate gear members.

19. In a power transmission toothed gearing where power is transmitted from two power units, a shaft, a driven gear thereon, two driving gears, a separate intermediate gear member for transmitting power from each driving gear to said driven gear, means for supporting the intermediate gear members so as to compensate for distortion of the driving gears and the intermediate gear members, and a thrust bearing mounted on the frame of the gearing and coöperating with the shaft of the driven gear.

20. In a power transmission gearing, a driven gear, a shaft on which said gear is mounted, a frame in which said shaft is journaled, two driving gears, a separate intermediate gear member for transmitting power from each driving gear to said driven gear, a separate frame in which each gear member is journaled, and means for mounting each of said separate frames on said first mentioned frame so that they are capable of moving to different angular positions.

21. In a power transmission gearing, a driven gear, a shaft on which said gear is mounted, a frame in which said shaft is journaled, two driving gears, a separate intermediate gear member for transmitting power from each driving gear to said driven gear, a separate frame in which each gear member is journaled, means for mounting each of said separate frames on said first mentioned frame so that they are capable of moving to different angular positions, and a thrust bearing between said shaft and said first mentioned frame.

22. In a power transmission gearing, a driven gear, a frame in which said gear is journaled, a driving gear, an intermediate gear member for transmitting power from the driving gear to the driven gear, a floating frame in which said gear member is journaled and an I-beam supported by said first mentioned frame and on which said floating frame is mounted, said I-beam being so located with relation to said intermediate gear member that the center of forces normally acting on the floating frame falls within the plane of the normal position of the web of the I-beam.

In testimony whereof, I have hereunto subscribed my name this 13th day of June, 1916.

FRANCIS HODGKINSON.